United States Patent Office 3,494,064
Patented Feb. 10, 1970

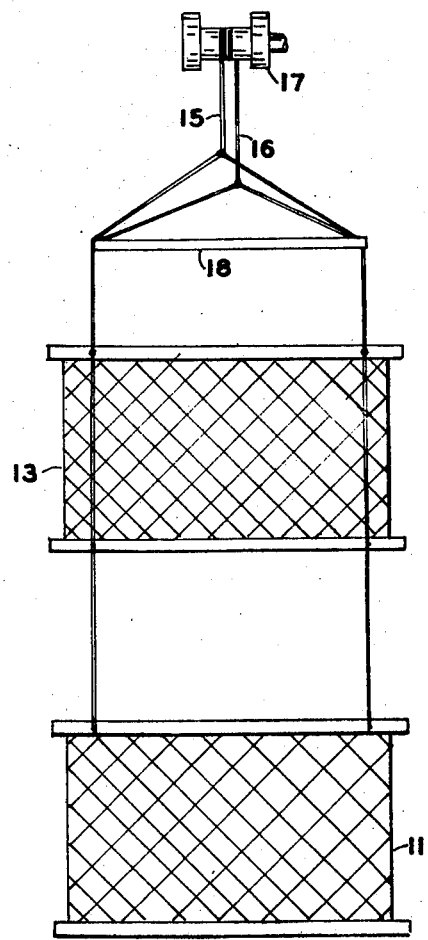
FIG 2
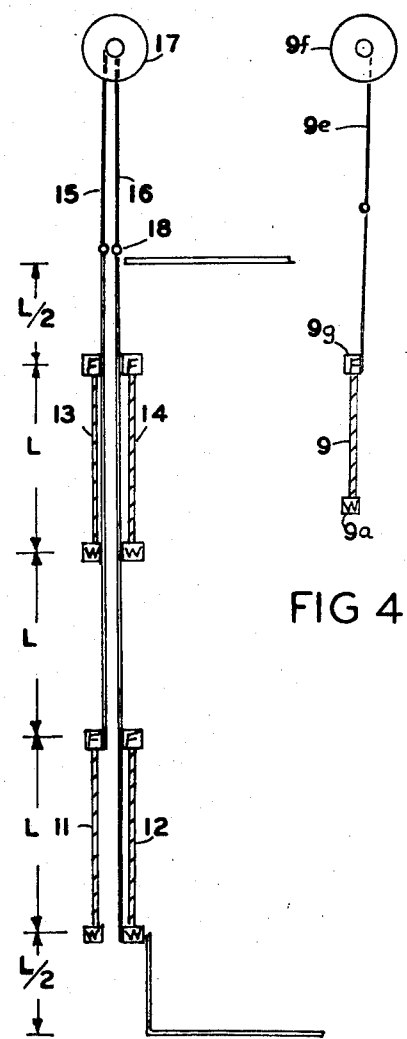
FIG 3
FIG 4

3,494,064
FISHING TRAP
Julian Stein, 338 Fairway Drive,
Franklin Square, N.Y. 11010
Filed Oct. 23, 1968, Ser. No. 770,032
Int. Cl. A01k 79/02, 71/00
U.S. Cl. 43—17.1    7 Claims

ABSTRACT OF THE DISCLOSURE

A fish trap comprising an enclosure consisting of net surfaces. Anchors and floats hold the enclosure substantially stationary. A center wall of net material divides the enclosure into a trapping section and a storage section. A movably mounted gate is mounted in one or more walls of said trapping section. Means are provided to periodically enclose all fish in the trapping section and periodically sweep them from the trapping section to the storage section. Sound producing devices are utilized to scare fish into the trapping area.

---

This invention relates to fish traps and, more particularly, to such traps having a trapping section which is automatically emptied into a storage section.

The trap of the present invention may be more or less permanently located. The trapping section includes automatic closing gates. After the gates are closed, the trapping section is emptied into a storage section which may be emptied periodically, for instance, once every few days. In this way, a number of traps may be serviced by the same fishing boat in the same fashion that lobster traps are serviced.

More particularly, the trap enclosure is divided into equal size trapping and storage portions by means of a wall. All the walls are made of netting material with optional reinforcing struts and the whole thing is held by anchors. The trap area which has a plurality of overlapping gates which are adapted to be closed by means of a motor operated pulley which is mounted on a float on top of the water. Inside the trap area is located a movably driven platform or piston which is adapted to be pulled up so that the trapped fish will exit, as illustrated by the arrow, into the storage area through a gate in the upper portion of the middle wall, which would be opened for this purpose. Inside the storage area is mounted a bucket which is adapted to be raised at periodic intervals to empty the fish from the trap. The top of the storage area would close the bucket as it is raised.

The controls are preferably automatic so that the gates and the piston would operate, for instance, every half hour to empty the trapped fish into the storage area, and the stored fish could be emptied by the operator every day or few days by raising the bucket. A number of traps may be serviced by one boat in the manner of lobster fishing.

Accordingly, a principal object of the invention is to provide new and improved fishing trap means.

Another object of the invention is to provide new and improved fishing trap means having a trapping section and a storage section.

Another object of the invention is to provide new and improved fishing trap means having a trapping section and a storage section, the trapping section having means to empty into the storage section automatically and periodically, and the storage section being adapted to be emptied every few days or a week by the operator.

Another object of the invention is to provide a new and improved fish trap comprising an enclosure consisting of net surfaces mounted on supporting members, anchor and float means to hold nets, cables and other tension members of said enclosure taut and substantially stationary, an interior wall of net material mounted in said enclosure to divide said enclosure into a trapping section and a storage section, a movably mounted first set of gates mounted in one or more walls of said trapping section, means to open and close said gates, a movably mounted second gate in said center wall adapted to connect said trapping area with said storage area, a driven member mounted in said trapping section, and means to move said driven member to drive fish from said trapping section through said second gate into said storage section.

These and other objects of the invention will be apparent from the following specification and drawings, of which:

FIGURE 2 is a front view of the gate means for the trapping section.

FIGURE 3 is a side view of FIGURE 2.

FIGURE 4 is a detail view of the interior gate between the trapping area and the storage area.

Figure 1:
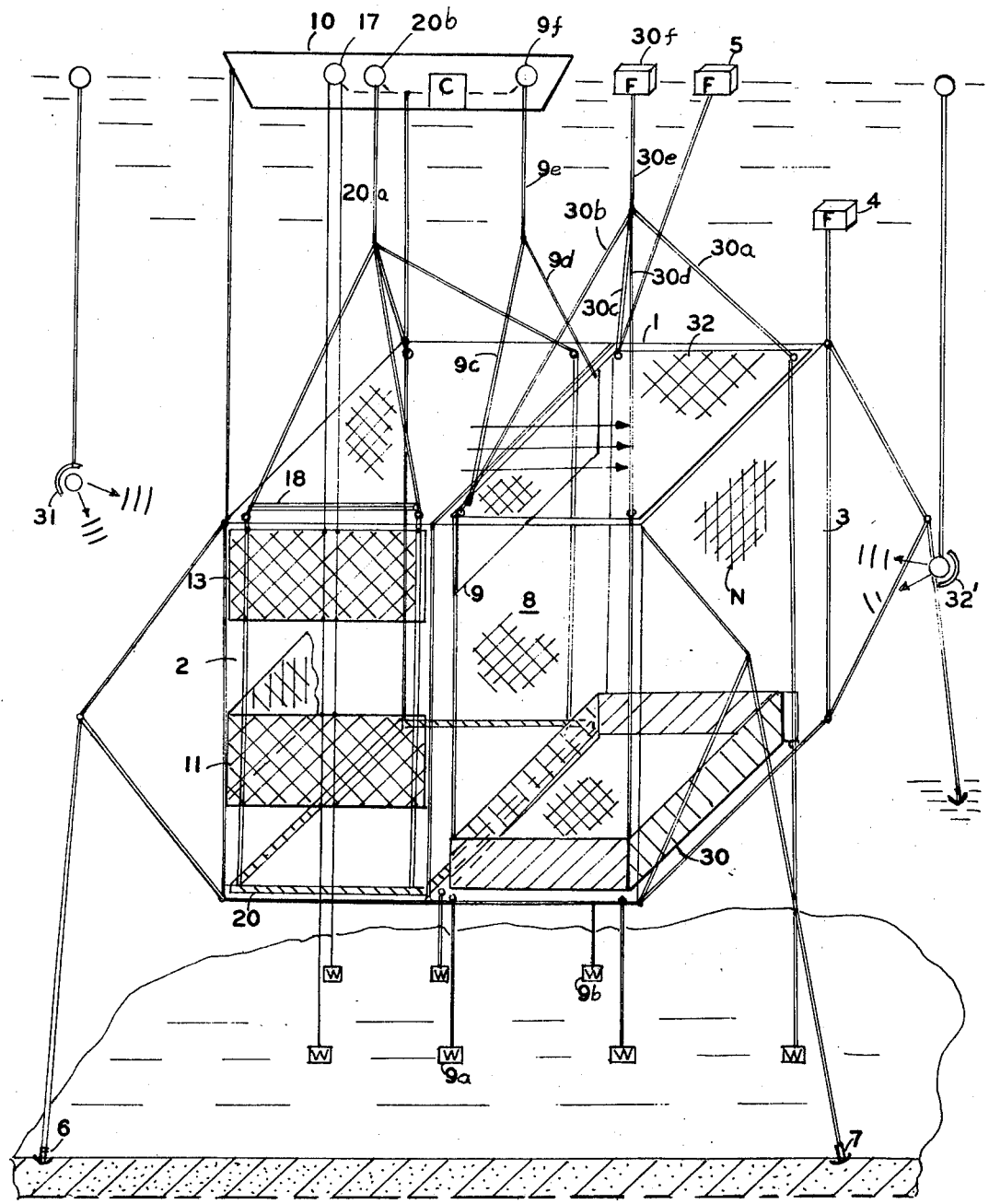
FIGURE 1 is a perspective view of an embodiment of the invention.

Refering to the figures, the invention generally comprises an enclosure 1 having a trapping section 2 and a storage section 3, which are shown equal in size. However, in many cases, the storage area may be made smaller than the trapping area.

The shape of the enclosure is shown as cubicle with a rectangular cross section. However, the shape is not critical, since the cross section might be triangular polysided, or circular. The enclosure is supported by a plurality of floats 4, 5, etc., which are preferably connected to the corners of the enlosure and the enclosure is preferably anchored to the bottom by means of anchors 6, 7, etc., which are preferably connected to the upper and bottom corners. The frame of the enclosure may be of cables or ropes or, if desired, stiffening members such as aluminum rods may be used.

All surfaces of the enclosure, including the sides, bottom and top, are covered with a net material N which may be commercially available fishnet material of various kinds and sizes of mesh, depending upon the particular application. The enclosure is divided into two sections by an interior wall 8. At the upper end of the wall is a vertical sliding gate 9 which may comprise a substantially rigid frame, for instance, of aluminum rod, with the surface being covered by netting material. The gate is weighed down by the weights 9a, 9b and the gate is adapted to be lifted by means of the cables 9c, 9d, and 9e, which is adapted to be raised by the motor driven pulley 9f, mounted in a large float 10 riding on the surface of the water.

FIGURE 4 shows a side view of the gate 9, illustrating how the gate is partially balanced by the action of the float 9g and the weight 9a, so that a small pull on the cables 9e by means of the motor driven pulley 9f will serve to raise the gates 9. The float 9g and the weight 9a hold the net taut. The pulleys 9f, 17 and 20b may be driven by any of a number of different type motors including, but not limited to, electric or pneumatic motors. It is possible that the motor could be a device actuated by currents, wave or wind motion. The gates are guided by the weight ropes. However, additional guide ropes may be provided, if desired.

Also, referring to FIGURES 2 and 3, there are shown gates 11, 12, 13, 14, which are mounted on cables 15 and 16 and which are adapted to be raised by means of the motor driven pulley 17. The cables 15 and 16 are preferably supported by a spreader 18 and the various gates are each held taut and balanced by their own floats F and weights W. The gates are connected by the cables so that when the pulley rotates in one direction, the gates will move a distance of L/2 and be opened into the position shown in FIGURES 2 and 3, and when the pulley rotates in the opposite direction, gates 11 and 13 will rise and gates 12 and 14 will fall, completely covering the wall of the trapping section. The motorized pulleys 17 and 9f are preferably connected together or controlled so that when the enclosure gates close, the storage gate 9 will open. After this happens, a movable platform sweeping member 20 is raised, causing any fish in the trap area to be raised up and forced into the storage area. The platform 20 is preferably balanced by floats and weights in the same manner as the gates and it is actuated by means of the cable 20a, which is connected to the motorized pulley 20b and the float 10. The pulley 20b is adapted to be controlled so that it will operate when the main gates are closed and the interior gate is open.

All of these pulleys could be operated manually in desired sequence. However, it is preferable to connect them to a control C for operating in a desired sequence for automatic operation.

The timing of the sequence would be dependent upon the conditions at a particular time and location. For instance, the trapping area could be swept once every 20 minutes, or once every 30 or 40 minutes as desired.

The storage area would be emptied at less frequent intervals, for instance, once every day or few days. This operation would preferably be directly controlled by the operator, since the fish would have to be emptied into the collecting boat.

The means for emptying the storage area comprises a platform or bucket 30, which is adapted to be raised by means of the cables 30a, 30b, 30c, 30d, 30e. The cable 30e would normally be connected to a float 30f so it could be picked up by the operator when desired and connected to a power winch on the boat for raising the bucket 30. When the bucket 30 is raised, it is also necessary to raise with it the top 32 of the storage section. The top 32 may be a sustantially rigid frame which normally rests on top of the storage area by means of weights, but which is adapted to rest on top of the bucket 30 when the bucket 30 is raised. Guide ropes may be provided for the bucket.

Figure 1A:
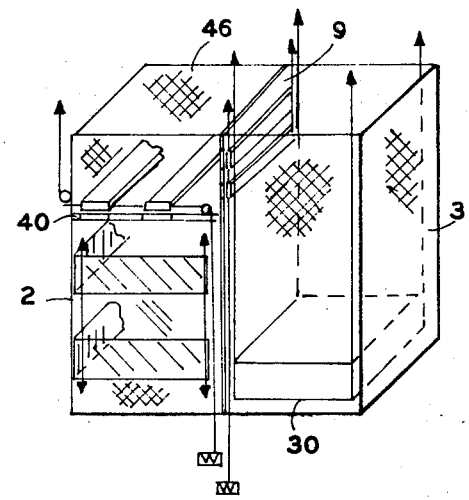
FIGURE 1A is a diagram illustrating a modification of the invention.

FIGURE 1A illustrates a modification having a horizontal gate 40 which provides additional storage area above it. The gate would operate in sequence so as to pass the fish only when the driver is raised.

Figure 5:
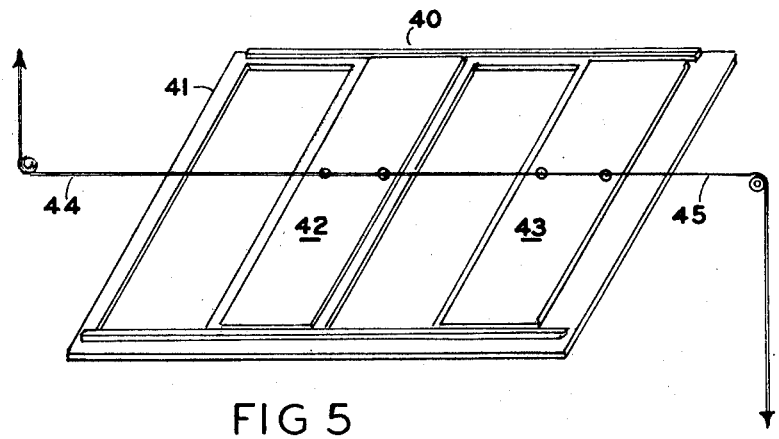
FIGURE 5 is a detail view of a horizontal gate.

FIGURE 5 shows details of gate 40. It may comprise a stationary mask 41 and sliding gate members 42, 43, slidably connected to mask 41 and operated by ropes 44 and 45. As shown, the gate is open. When rope 44 is pulled, the sliding gate 42, 43 covers the rectangular openings in the mask 41, thus closing the gate.

The modification shown in FIGURE 1A operates like the fish trap shown in FIGURE 1 with the exception of the following differences:

(a) The horizontal gate of FIGURE 5 is located above the main trapping gates.

(b) The trapping section 2 is the volume below the horizontal gate 40.

(c) The storage area includes the original storage area 3 and in addition it includes the volume 46 above the horizontal gate.

(d) The vertical gate 9 remains open until the operator comes to remove the fish by raising the bucket 30. Prior to raising the bucket 30, gate 9 is closed.

With the exception of fish that are small enough to pass through the net, almost 100% of the trapped fish will be driven into storage for the following reasons;

(a) Once the main gates close, they are fully enclosed.

(b) The horizontal piston dirves up flush against the horizontal gate. The only place for the fish to go is through the openings in the horizontal gate.

(c) Before the piston is lowered, the horizontal gate closes, enclosing the fish in the storage area.

Since gate 9 is open, the fish are free to wander between storage area 46 and storage area 3. In a period of 24 hours or longer, most of the fish can be expected to wander into storage area 3 which is many times as large as storage area 46. Therefore, a second piston to drive the fish from area 46 to area 3 is not necessary. When gate 9 is closed and bucket 30 is raised, only the fish in storage area 3 are removed. The fish in storage area 46 do not escape, however. They remain in storage and most of them will be removed in a day or two when the servicing boat returns.

The entire structure may consist of tension members and may be formed of ropes or cables, except for the few instances where spreaders are necessary to separate cables. It may be desirable to use struts to frame relatively rigid gate members or platform members. It is preferable that use of rigid members be kept to a minimum to avoid snagging these members into the net material, which might cause a jamming of the apparatus. Tension members can also absorb the energy of a disturbing force, bend with the blow and then return to their original position as soon as the disturbance ends. In addition, construction made of tension members is expected to be lighter and less expensive.

The invention may be used with various refinements and additions such as the use of bait, chum pots, and the use of acoustical repelling devices. For instance, a plurality of wave operated gongs, wave operated sound transducers, electrically operated transducers, or other highly directional sound devices 31, 32', may be placed in such a manner as to funnel a school of fish into the trap area. The sound devices could be located in various other configurations, for instance, to close off a channel or area which might bypass the trap area. The sound repelling devices may form a corral around the trap and project directionally toward the trap to form a much larger secondary trap area. The random movement of fish into the secondary trap area will have a minimum disturbance, because the highly directional repelling devices can hardly be detected from outside the perimeter.

The random movement of fish within the secondary trap area will be controlled by the repelling devices, since there will be a greater probability that they will turn away from the repelling devices at the perimeter and back toward the fish trap at the center.

The depth of the trap may be set by choosing the lengths of the anchor and float cables. The depth and trap direction would be chosen by evaluating factors, such as terrain, water currents, tides and temperature, type of fish available, etc.

Many modifications may be made by those who desire to practice the invention without departing from the scope thereof.

I claim:

1. A fish trap comprising an enclosure consisting of net surfaces mounted on supporting members,
   means to hold said enclosure substantially stationary,
   interior wall means of net material mounted in said enclosure to divide said enclosure into a trapping section and a storage section,
   movably mounted exterior gate means mounted in at least one wall of said trapping section,
   means to open and close said gate means,
   a movably mounted second interior gate adapted to connect said trapping area with said storage area, a driven member mounted in said trapping section, and means to move said driven member to drive fish from said trapping section through said second gate into said storage section.

2. Apparatus as in claim 1 having a removable bucket mounted in said storage area.

3. Apparatus as in claim 1 having motor means to operate said exterior and interior gate means.

4. Apparatus as in claim 1 wherein said exterior gate means comprises a plurality of net gate sections mounted on supporting members and means to move said gate sections, said gate sections being adapted to overlap when in closed position to form continuous enclosure walls.

5. Apparatus as in claim 1 having a plurality of repelling sound generators mounted around said enclosure.

6. Apparatus as in claim 1 wherein said means to hold said enclosure stationary comprises anchor means and float means.

7. Apparatus as in claim 1 wherein said enclosure includes tension members and means to hold said tension members taut and in place, comprising anchor, float and weight means connected to said tension members.

References Cited

UNITED STATES PATENTS

| | | | |
|---|---|---|---|
| 1,146,911 | 7/1915 | Wilkerson | 43—102 |
| 2,102,628 | 12/1937 | Knerr | 43—102 X |
| 3,305,962 | 2/1967 | Abrahamsen et al. | 43—17.1 |

WARNER H. CAMP, Primary Examiner

U.S. Cl. X.R.

43—102